(12) United States Patent
Zieger

(10) Patent No.: US 12,484,839 B2
(45) Date of Patent: Dec. 2, 2025

(54) ELECTROMYOGRAPHIC BRUXISM TRAINING

(71) Applicant: Crestmont Ventures, Inc., Pasadena, CA (US)

(72) Inventor: Niclas-Henning Zieger, Pasadena, CA (US)

(73) Assignee: Crestmont Ventures, Inc., Pasadena, CA (US)

(*) Notice: Subject to any disclaimer, the term of this patent is extended or adjusted under 35 U.S.C. 154(b) by 910 days.

(21) Appl. No.: 17/715,490

(22) Filed: Apr. 7, 2022

(65) Prior Publication Data

US 2022/0370006 A1 Nov. 24, 2022

Related U.S. Application Data

(60) Provisional application No. 63/192,418, filed on May 24, 2021.

(51) Int. Cl.
*A61B 5/00* (2006.01)
*A61B 5/389* (2021.01)

(52) U.S. Cl.
CPC .......... *A61B 5/4557* (2013.01); *A61B 5/389* (2021.01); *A61B 5/742* (2013.01)

(58) Field of Classification Search
CPC ....... A61B 5/4557; A61B 5/389; A61B 5/742; A61B 5/486; A61B 5/24; A61B 5/25;

(Continued)

(56) References Cited

U.S. PATENT DOCUMENTS

| 8,690,800 B2 | 4/2014 | Lillydahl et al. |
| 2017/0071529 A1 | 3/2017 | Haugland et al. |

(Continued)

FOREIGN PATENT DOCUMENTS

| KR | 102063143 B1 | 12/2019 |
| WO | 2014176420 A1 | 10/2014 |
| WO | 2022/250793 A1 | 12/2022 |

OTHER PUBLICATIONS

Search History for Application No. PCT/US22/23820, mailed May 11, 2022 (4 pages).

(Continued)

*Primary Examiner* — Eric F Winakur
*Assistant Examiner* — Sienna C Pyle
(74) *Attorney, Agent, or Firm* — Jennifer Hayes; Nixon Peabody LLP

(57) ABSTRACT

A bruxism training device is disclosed that is capable of detecting bruxism events (e.g., jaw clenching and teeth grinding) via external electromyography (EMG). The training device is shaped to be easily placed in a proper location and proper orientation over a masseter muscle of a user. A locator region is provided to facilitate easy locating of a reference electrode over the gonial angle of the mandible, while an alignment edge of the training device is provided to facilitate easy locating of end electrodes adjacent an end of the masseter muscle coupled to the mandible. With the locator region and alignment edge in place, an array of mid electrodes is automatically positioned over a bulk of the masseter muscle, allowing useful EMG measurement to be acquired of masseter activation.

20 Claims, 9 Drawing Sheets

(58) Field of Classification Search
CPC .......... A61B 5/251; A61B 5/257; A61B 5/68;
A61B 5/6814
See application file for complete search history.

(56) References Cited

U.S. PATENT DOCUMENTS

| | | |
|---|---|---|
| 2017/0135626 A1 | 5/2017 | Singer |
| 2019/0029595 A1 | 1/2019 | Sekitani et al. |
| 2023/0014065 A1* | 1/2023 | Hanein ................. A61B 5/257 |

OTHER PUBLICATIONS

International Search Report for Application No. PCT/US22/23820, mailed Jul. 8, 2022 (7 pages).

\* cited by examiner

ELECTROMYOGRAPHIC BRUXISM TRAINING

CROSS REFERENCE TO RELATED APPLICATIONS

The present application claims the benefit of U.S. Provisional Application No. 63/192,418, filed May 24, 2021 and entitled "ELECTROMYOGRAPHIC BRUXISM TRAINING," which is hereby incorporated by reference in its entirety.

TECHNICAL FIELD

The present disclosure relates to medical devices generally and more specifically to bruxism monitoring and training devices and methods.

BACKGROUND

Bruxism is a condition involving the grinding or clenching of teeth. While some minor cases of bruxism may not require treatment, moderate to severe cases of bruxism can lead to jaw disorders, damaged teeth, muscle disorders, headaches, and other such complications. Often, individuals suffering from bruxism during sleep do not notice the grinding or clenching until complications arise.

Common treatment for bruxism is the wearing of oral appliances (e.g., splints) during sleep. These oral appliances are generally designed to absorb the forces that can lead to damage. These oral appliances are limited in effectiveness, especially because they may not be suitable to train a user against continued bruxism; may be uncomfortable to wear; and may interfere with other activities, such as eating or speaking, while worn. Users are thus reluctant and discouraged from wearing such oral appliances during the day.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, supplemented by this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present disclosure include a training device comprising a body having a locator region, a blanket region, and an alignment edge. The locator region, the blanket region, and the alignment edge are fixedly spaced apart such that the blanket region is positioned over a masseter muscle of a user when the locator region is positioned over a gonial angle of a mandible of the user and the alignment edge is positioned along an inferior border of the mandible of the user. The training device includes an electrode assembly including a reference electrode positioned at the locator region; at least one end electrode positioned at the alignment edge; and an electrode array including a plurality of mid electrodes. The electrode array is positioned at the blanket region. The training device further includes a processing module coupled to the electrode assembly for identifying activation of the masseter muscle using the electrode assembly.

Embodiments of the present disclosure include a method that comprises providing a training device having a locator region, an alignment edge, and a blanket region. The training device further includes an electrode assembly including a reference electrode positioned at the locator region; at least one end electrode positioned at the alignment edge; and an electrode array including a plurality of mid electrodes. The electrode array is positioned at the blanket region. The method further includes securing the training device to a user. Securing the training device to the user includes positioning the locator region over a gonial angle of a mandible of the user; positioning the alignment edge along an inferior border of the mandible of the user; and automatically positioning the blanket region over a masseter muscle of the user in response to positioning the locator region over the gonial angle and positioning the alignment edge along the inferior border of the mandible. The method further includes receiving electrical signals from the electrode assembly and identifying activation of the masseter muscle based on the received electrical signals.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
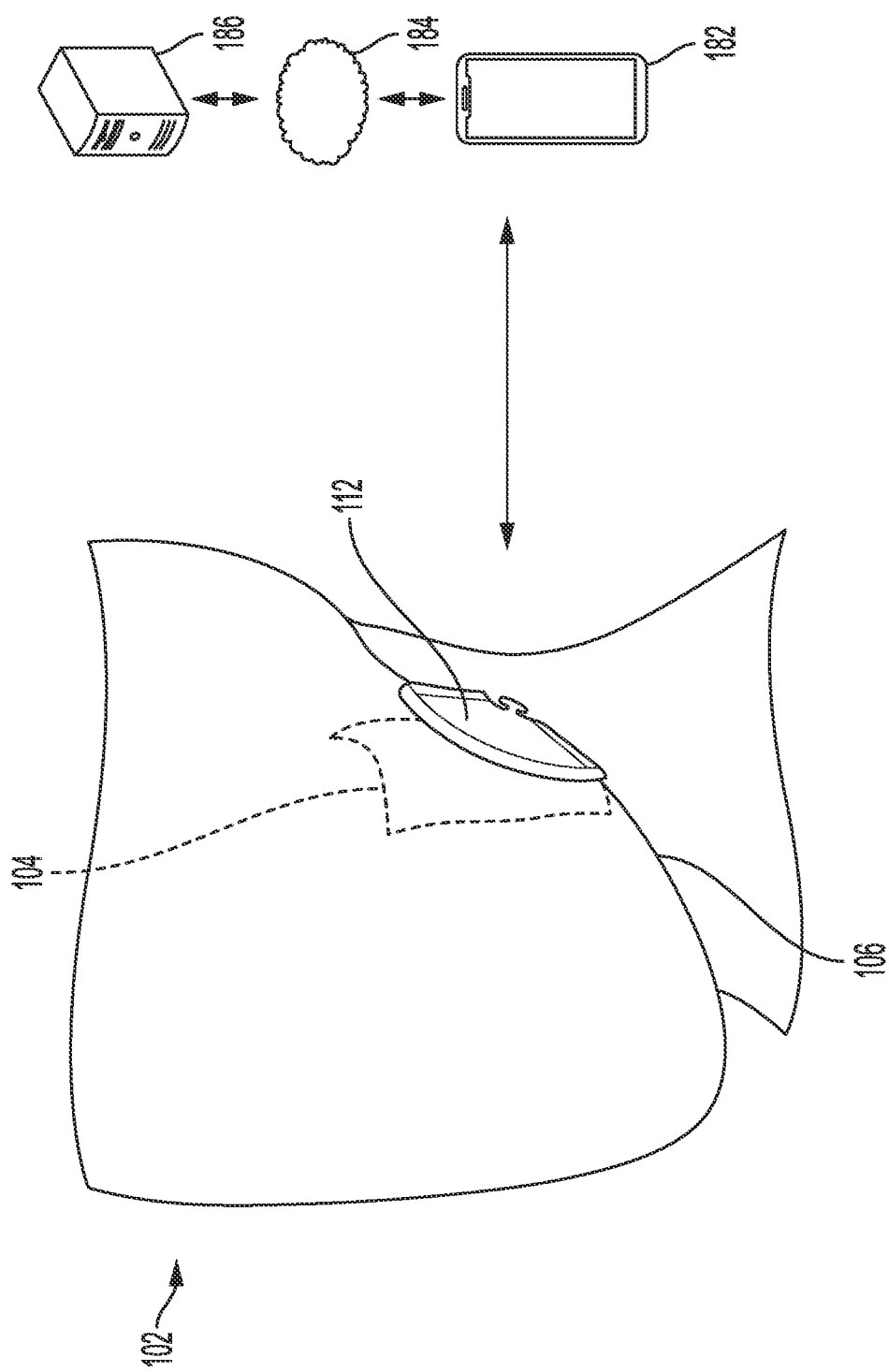
FIG. 1 is a three dimensional projection of a training device secured to a user, according to certain aspects of the present disclosure.

Certain aspects and features of the present disclosure relate to a bruxism training device capable of detecting bruxism events (e.g., jaw clenching and teeth grinding) via external electromyography (EMG). The training device is shaped to be easily placed in a proper location and proper orientation over a masseter muscle of a user. A locator region is provided to facilitate easy locating of a reference electrode over the gonial angle of the mandible, while an alignment edge of the training device is provided to facilitate easy locating of end electrodes adjacent an end of the masseter muscle coupled to the mandible. With the locator region and alignment edge in place, an array of mid electrodes is automatically positioned over a bulk of the masseter muscle, allowing useful EMG measurement to be acquired of masseter activation.

While mitigation of bruxism events can be somewhat helpful in treating bruxism, the detection of bruxism events can not only provide mitigating benefits, but can also train a user to better self-monitor against bruxism and avoid bruxism events entirely. Internal bruxism detection (e.g., detection of bruxism using sensors placed within an oral cavity) have various limitations that make them unsuitable for long-term use and unsuitable for use in situations where the appliance or splint may otherwise interfere with the user's natural activities, such as speaking and eating. External bruxism detection can be used for extended periods of time (e.g., overnight, throughout the day, over a course of tens of hours, over the course of multiple days, and the like) and does not interfere with speaking, eating, and the like. However, accurate external bruxism detection requires accurate electrode placement. While accurate electrode placement can be performed by a skilled technician (e.g., in a laboratory setting) or achieved via repeated placement, measurement, and adjustment routines, it can be difficult for a user to self-place electrodes accurately.

According to certain aspects and features of the present disclosure, a training device can provide repeatably accurate electrode placement for external EMG bruxism detection. The training device can include an electrode assembly containing a reference electrode, at least one end electrode, and an array of mid electrodes (e.g., 1 or more, 2 or more, or more than 3). Proper electrode placement can include placing the reference electrode in a reference location, such as adjacent a bone or bony prominence; placing the end electrode(s) adjacent an end of the muscle to be interrogated; and placing the mid electrode(s) adjacent the muscle at a location spaced apart from the end electrode, such as adjacent a bulk of the muscle (e.g., at or near a middle portion of the muscle between a first end and an opposite end).

The distances between the electrodes of the electrode assembly can be fixed and known. The locations of the electrodes of the electrode assembly can be fixed and known with respect to a body of the training device. Therefore, proper placement of the body of the training device can result in proper placement of the electrodes of the electrode assembly. The body of the training device can be shaped to facilitate proper electrode placement in an easily repeatable fashion.

The body can include a locator region that is specifically shaped and/or provided with other mechanical or visual identifiers allowing the user to identify it as the locator region. The locator region can be designed to be placed over a particular feature of the user's anatomy. In an example used herein, the locator region can be designed to be placed adjacent or over (e.g., on the skin adjacent) the gonial angle of the user's mandible. To ensure the reference electrode is properly placed, the reference electrode can be fixed with respect to the locator region (e.g., positioned at the locator region), thus ensuring the reference electrode is properly positioned over the gonial angle when the locator region is placed over the gonial angle. Since the gonial angle is easy to find by sight or minor palpitation, a user can easily and repeatably place the locator region over the gonial angle, thus easily and repeatably placing the reference electrode in the proper location.

The body can include an alignment edge or other identifiable feature designed to be placed on a second feature of the user's anatomy. As used in the example herein, the alignment edge can be placed along an inferior border of the mandible, such as the inferior border of the mandible at a location anterior to the gonial angle. The masseter muscle is anchored on the inferior border of the mandible. Thus, to ensure the end electrode(s) are properly placed, the end electrode(s) can be fixed with respect to the alignment edge, thus ensuring that the end electrode(s) are properly positioned over an end of the masseter muscle when the locator region is placed over the gonial angle and the alignment edge is placed over the inferior border of the mandible.

The body can include a blanket region, which can be a region of the body containing the array of mid electrodes. When the locator region and alignment edge are properly placed, the blanket region can be automatically located at a desired position. Thus, when the locator region and alignment edge are properly placed on the gonial angle and border of the mandible, respectively, the array of mid electrodes can be automatically located at a desired location along the masseter muscle. Thus, a user can ensure all electrodes of the electrode assembly are properly placed for bruxism detection simply by positioning the locator region over the gonial angle and the alignment edge along the inferior border of the mandible.

In some cases, the body can include multiple alignment edges that can be used for alignment. For example, a training device can be usable on either a left side or right side of the user's mandible by providing a first alignment edge for alignment on the inferior border of the mandible when used on the left gonial angle, and a second alignment edge for alignment on the inferior border of the mandible when used on the right gonial angle. In some cases, the body can be bilaterally symmetric along a line passing through the locator region, and optionally the blanket region. As used herein, the term contralateral is used to denote a feature located on an opposite side of a previously referenced feature. For example, a first gonial angle (e.g., left gonial angle) and a gonial angle on the opposite side of the body (e.g., a right gonial angle) can be referred to as a gonial angle and a contralateral gonial angle.

The training device can be secured to the skin using any suitable technique, such as adhesives, tape, clothing (e.g., a wearable mask or strap), or the like. In some cases, the training device is removably couplable to an interface substrate. The interface substrate can be a thin interface designed to adhere to a user's skin and removably couple to the body of the training device. In some cases, the interface substrate removably couples to the body of the training device via magnetic attraction. The interface substrate can include one or more electrode-receiving spaces for accepting the electrodes of the training device. These electrode-receiving spaces can be holes or depressions in the interface substrate. In some cases, the interface substrate exposes the electrodes directly to the skin of the user. In other cases, the interface substrate includes a conductive layer, such as a layer of conductive gel, positioned between the user's skin and each electrode. The interface substrate can include an adhesive layer for adhering to the skin of the user. The interface substrate can be made of a non-conductive substrate material to avoid electrical conduction between electrodes. In some cases, the adhesive layer and any conductive layer can be covered by a removable protective layer (e.g., a peel-away layer), such as a removable film. The use of such an interface substrate can improve the ease of use of the training device, as the interface substrate can be disposable, reducing the amount of cleaning and preparation needed to reuse the training device.

Once the training device is placed, EMG data can be acquired from the electrodes of the electrode assembly in the form of electrical signals. The use of multiple end electrodes and/or the array of mid electrodes can permit the training device to acquire signals from many different combinations of electrode pairs. In some cases, the training device can automatically select a subset of the best combinations of electrode pairs from which to acquire future measurements. This automatic selection, or calibration, can occur each time the training device is placed on a user's skin. Thus, differences in anatomy from one person to the next, as well as minor differences in placement of the training device on a given user, can be accommodated. Thus, the training device is tolerant of anatomical differences and a degree of placement inconsistency while still providing useful data.

The acquired EMG data can be used to identify bruxism events or predict a future bruxism event. The EMG data can be used to identify activation of the masseter muscle. In some cases, the EMG data can be used to identify activation of specific motor units of the masseter muscle. In some cases, the activation of the masseter muscle, the activation of specific motor units of the masseter muscle, and the extent of one or both of these activations can be used to identify a bruxism event or predict a future bruxism event. As used herein, identification of activation of the masseter muscle or identification of activation of motor unit(s) of the masseter muscle can include identification of activation of the respective muscle or motor unit above a threshold amount. Thus, in some cases, minor contractions in the masseter muscle may not be considered "activation of the masseter muscle" if they are below a threshold level. The threshold level(s) can be preset, be automatically determined, or be user-set to achieve the desired level of bruxism detection.

The EMG data can be used to generate a log of muscle activation and/or bruxism events, such as over the course of a given period of time (e.g., overnight and/or throughout a day). This log can be presented to the user via a smartphone or other computing device coupled to the training device. The smartphone or other computing device can be coupled to the training device directly (e.g., via Bluetooth connection) or indirectly (e.g., via a local network or cloud network, such as the Internet). In some cases, the training device can be communicatively coupled to a computing device in real time. In some cases, the training device can occasionally be communicatively coupled to the computing device, such as after a threshold number of bruxism events, after a threshold period of time, or on demand (e.g., in response to a user actuating a button). In some cases, the training device can be coupled to the computing device when the training device is placed in a receiver, such as a charging station, which can itself be communicatively couplable to the computing device.

The EMG data can be used to generate feedback (e.g., a feedback stimulus) in response to detection of a bruxism event or prediction of a future bruxism event (e.g., an anticipated bruxism event or incipient bruxism event). The generated feedback can be any stimulus detectable by the user, such as a haptic stimulus (e.g., a vibration), an audio stimulus (e.g., a beep or other noise), an electrical stimulus (e.g., an electrical impulse delivered via one of the electrodes of the electrode assembly or via one or more additional electrodes), a visual stimulus (e.g., illumination of a light emitting diode (LED)) or the like. In some cases, the feedback can be generated entirely by the training device. In some cases, such as when the training device is communicatively coupled to a computing device, the feedback can be generated at an external device (e.g., the computing device or another device communicatively coupled to the computing device) in response to a feedback signal sent by the training device. For example, detection of a bruxism event by the training device can cause the training device to send a wireless signal to a smartphone to cause the smartphone to vibrate, make a noise, display an alert, or provide other stimulus.

In some cases, the training device can include one or more input devices, such as a physical button, a capacitive button, or the like. The input device can be used to provide user input, such as to activate the training device, move the training device between different modes (e.g., a sleep mode and an awake mode), confirm a detected bruxism event, deny a detected bruxism event, indicate a non-detected bruxism event, and the like.

In some cases, a log of bruxism events can be augmented by additional user input or additional user data. For example, the log of bruxism events can be augmented by user input, such as self-reporting about whether or not the user realized the bruxism event was occurring or what the user was doing prior to the bruxism event. In another example, the log of bruxism events can be augmented by user data, such as heart rate data, position data (e.g., standing or laying down), location data, and the like. The additional user input or additional user data can come from the training device or another device (e.g., another wearable device, such as a smart watch, or a computing device, such as a smartphone).

The combination of immediate feedback and historical analysis may help reduce or eliminate bruxism events. Additionally, the external nature of the training device allows it to be used without the amount of required cleaning and/or sterilization necessary for a splint that is to be used within a user's mount.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a three dimensional projection of a training device 112 secured to a user 102, according to certain aspects of the present disclosure. The training device 112 can be in the form of a removable patch that can removably couple to the skin of the user 102. The training device 112 is placed on the skin of the user 102 over a portion of the mandible 106 and the masseter muscle 104. The training device 112 can be worn by the user 102 at any time, such as while sleeping, while awake, while eating, while speaking, and the like.

The training device 112 can be used on its own, providing biofeedback in response to detected bruxism events or anticipated bruxism events. For example, the training device 112 can provide biofeedback in the form of audio, haptic, electrical, and/or visual stimulus when a bruxism event occurs.

In some cases, the training device 112 can optionally be used with a user device 182. The user device 182 can be any suitable computing device capable of communicating with the training device 112, such as a smartphone, smart watch, tablet, computer, or the like. The user device 182 can be used to review logged data from the training device 112, update settings of the training device 112, generate biofeedback on behalf of the training device 112, and/or otherwise facilitate advanced interactions between the training device 112 and the user 102. For example, the user device 182 can collect, store, analyze, and/or display information related to bruxism events, such as frequency of bruxism events, intensity of bruxism events, the time and/or date of bruxism events, the day of the week of bruxism events, and/or other such information. In some cases, such information can be augmented with additional user data, such as user data associated with a user's food intake, caffeine intake, activity level, stresses, and the like.

In some cases, the training device 112 can optionally be used with a cloud 184 and/or a server 186. The server 186 can be any suitable computing device for storing and/or processing data associated with the user's use of the training device 112. For example, the training device 112 can upload recorded EMG data to the server 186 for processing to identify bruxism events or predict anticipated bruxism events. In some cases, the server 186 can store logged data for later retrieval by the user 102. The training device 112 can connect to the cloud 184 directly or via a user device 182. The cloud 184 can be any suitable network, such as a wide area network, like the Internet.

In some cases, the training device 112 can have a volume of approximately 0.15-1 cu in., such as at or approximately 0.20, 0.36, or 0.80 cu in. In some cases, the training device 112 can adhere to the skin of the user over a surface area of approximately 1.0 to 6.0 sq. in., such as at or approximately 1.3, 2.5, or 5.0 sq. in. As used herein, the term at or approximately includes a given value and a value within 1%, 2%, 3%, 4%, 5%, 6%, 7%, 8%, 9%, or 10% of the given value.

Figure 2:
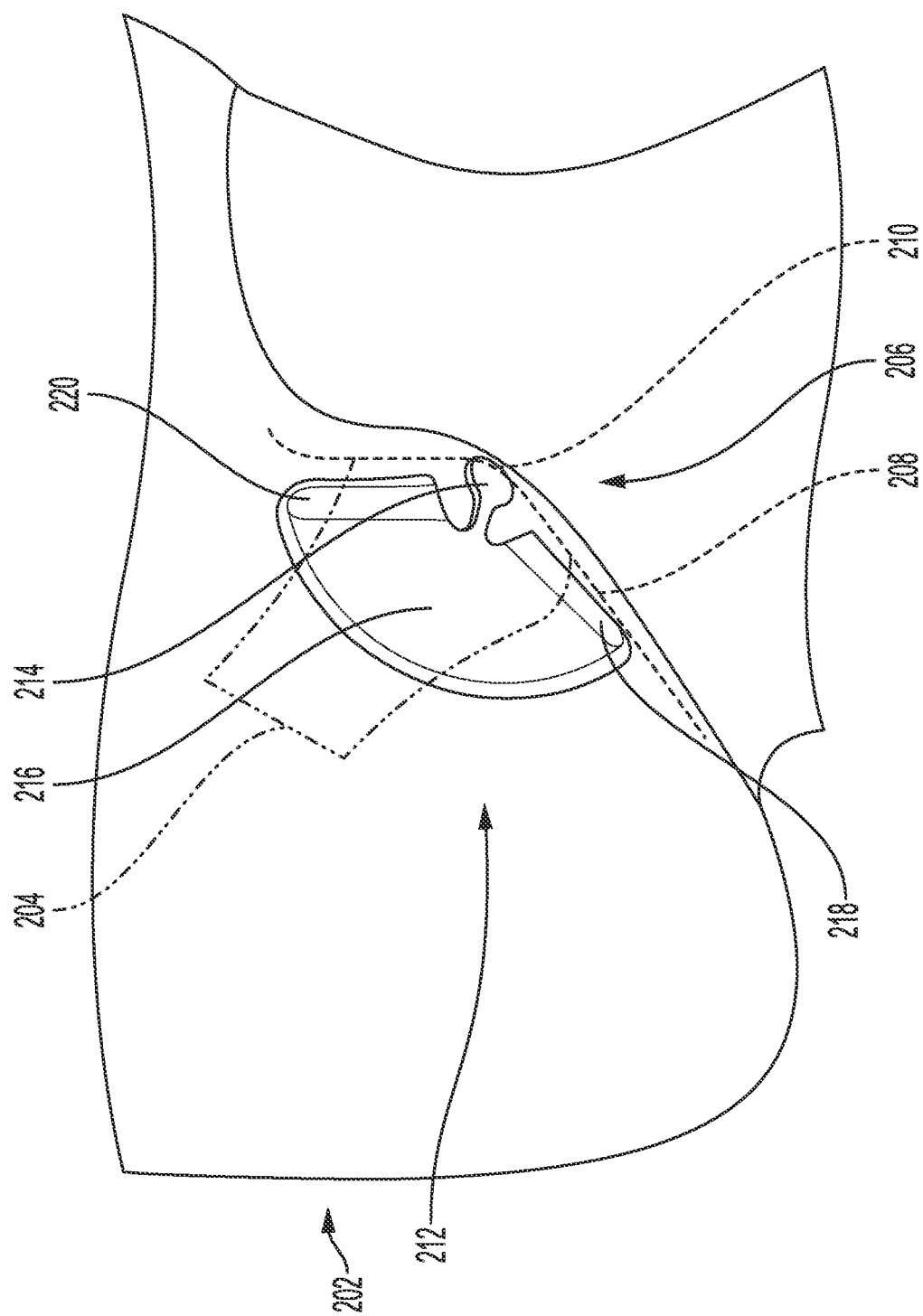
FIG. 2 is a side-view three dimensional projection of a training device secured to a user, according to certain aspects of the present disclosure.

FIG. 2 is a side-view three dimensional projection of a training device 212 secured to a user 202, according to certain aspects of the present disclosure. The training device 212 can by any suitable training device, such as training device 112 of FIG. 1. The head of the user 202 is depicted in FIG. 2 as turned slightly away for illustrative purposes.

The training device 212 can include a blanket region 216, a locator region 214, a first alignment edge 218, and a second alignment edge 220. In some cases, however, the training device 212 can be otherwise shaped, such as to include only a first alignment edge 218 and not second alignment edge 220.

The training device 212 is secured to the user 202 in a proper position for bruxism detection. The locator region 214 is secured to the user 202 over (e.g., at, adjacent, or covering) the gonial angle 210 of the mandible 206. As the training device 212 is placed on the left side of the face of the user 202, the first alignment edge 218 is used for alignment of the training device 212. The first alignment edge 218 is placed along an inferior border 208 of the body of the mandible 206. The body of the mandible 206 is that portion of the mandible 206 extending anteriorly from the gonial angle 210. More specifically, the inferior border 208 is an inferior border of the mandible that is anterior to and proximate to the gonial angle 210. Placing the first alignment edge 218 along the inferior border 208 can include placing the first alignment edge 218 parallel or approximately parallel (e.g., within 1°, 2°, 3°, 4°, 5°, 6°, 7°, 8°, 9°, 10°, 15°, or 20° of parallel) to the inferior border 208. The second alignment edge 220 can be used in place of the first alignment edge 220 when the training device is placed on the contralateral gonial angle (e.g., right side of the face of the user 202).

When the locator region 214 and alignment edge (e.g., first alignment edge 218) are properly placed, the blanket region 216 of the training device 212 is automatically placed over the masseter muscle 204. Since the gonial angle 210 and border 208 are easy to locate due to their prominence in making up the jawline of a user 202, the entire training device 212, including the blanket region 216, can be easily and repeatably positioned in a useful and desirable location for bruxism detection.

While the training device 212 of FIG. 2 and other training devices described herein are described with reference to alignment using a gonial angle 210 and border 208, other easily discernable (e.g., easily palpable) anatomical landmarks can be used. For example, in some cases, a training device for use behind an ear can be sized and shaped such that its locator region is designed to be fit over the tip of the mastoid process and an alignment edge can be designed to fit around the back of the ear or along a border of the mastoid process. Such a training device can be constructed such that its blanket region can fall over the temporalis muscle, which can be used to identify bruxism in a similar fashion to that of the masseter muscle 204 as disclosed herein. When such a training device is used to measure the temporalis muscle in that fashion, it can be shaped somewhat similarly to the training device 212, although with a smaller angle. Other shapes can be used.

Figure 3:
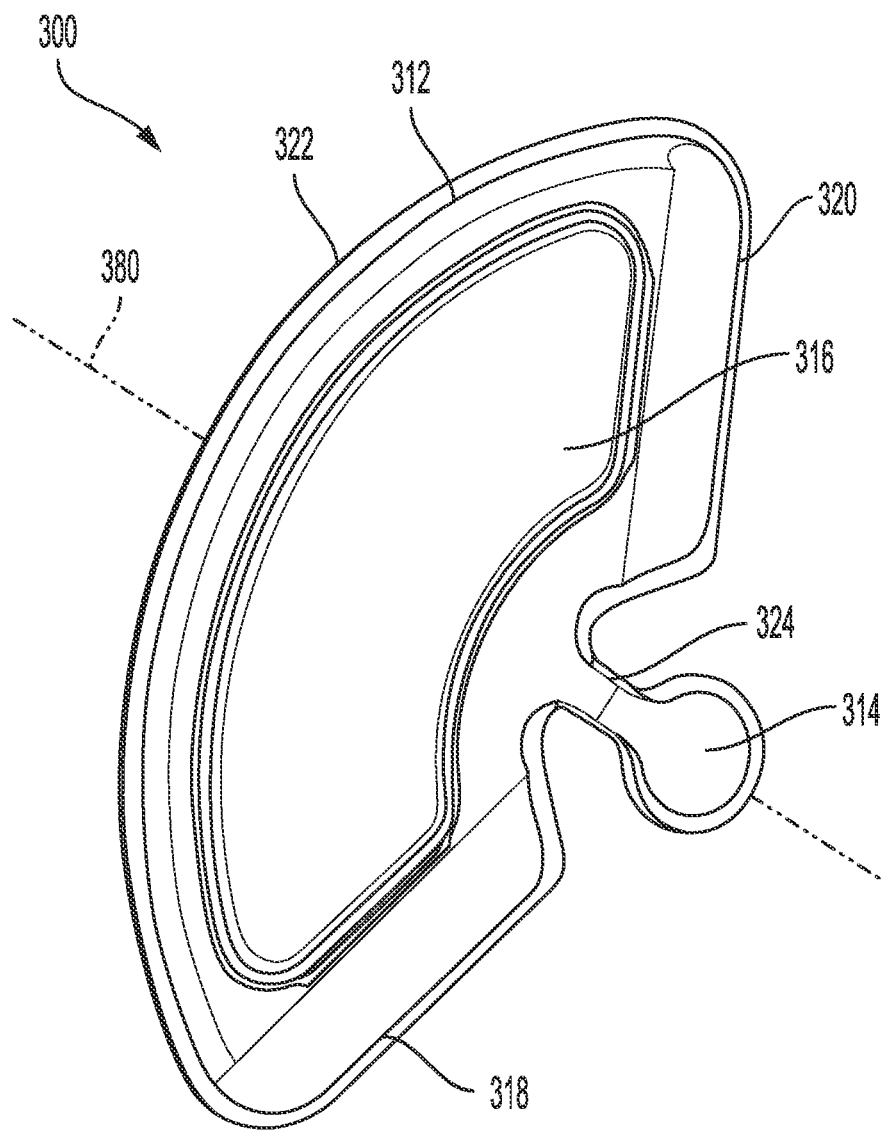
FIG. 3 is a top view of a training device, according to certain aspects of the present disclosure.

FIG. 3 is a top view of a training device 312, according to certain aspects of the present disclosure. The training device 312 can by any suitable training device, such as training device 212 of FIG. 2. The training device 312 can include a blanket region 316, a first alignment edge 318, a second alignment edge 320, and a locator region 314.

The locator region 314 can be formed to be readily identifiable and easy to place at the gonial angle. In some cases, the locator region 314 is in the shape of a circular or otherwise rounded shape, although that need not always be the case. In some cases, the locator region 314 can include one or more additional indicators to facilitate identification of the locator region 314 and/or placement of the locator region 314 on the gonial angle. For example, in some cases, the additional indicator can be a mechanical feature that corresponds to the shape of the gonial angle, such as a rounded border of the locator region 314 or an otherwise conforming shape. Other indicators can be used.

The blanket region 316, first alignment edge 318, second alignment edge 320, and locator region 314 can be spaced apart such that the locator region 314 is coupled to the first alignment edge 318 and second alignment edge 320 via the blanket region 316, although that need not always be the case. In some cases, the locator region 314 is spaced apart from the blanket region 316 and coupled to the blanket region 316 via an isthmus 324. The isthmus 324 is a narrowed section of material between the blanket region 316 and the locator region 314. In some cases, the isthmus 324 is flexible, permitting the locator region 314 to bend around and conform to the shape of the mandible, while permitting the blanket region 314 to remain secured to the skin of the user. The use of an isthmus 324 causes the locator region 314 to take the form of a tab.

As depicted in FIG. 3, the training device 312 is coupled to an interface substrate 322. The interface substrate 322 can be coupled to a bottom side of the training device 312. As depicted in FIG. 3, the top side of the training device 312 is facing out of the page, while the bottom side of the training device 312 is facing into the page.

The training device 312 can be symmetrical along an axis of symmetry 380. The axis of symmetry 380 can pass through the locator region 314 and the blanket region 316. Thus, the training device 312 can be used on either side of a user's face with equal efficacy. In some cases, however, the training device 312 is not symmetrical along such an axis.

Figure 4:
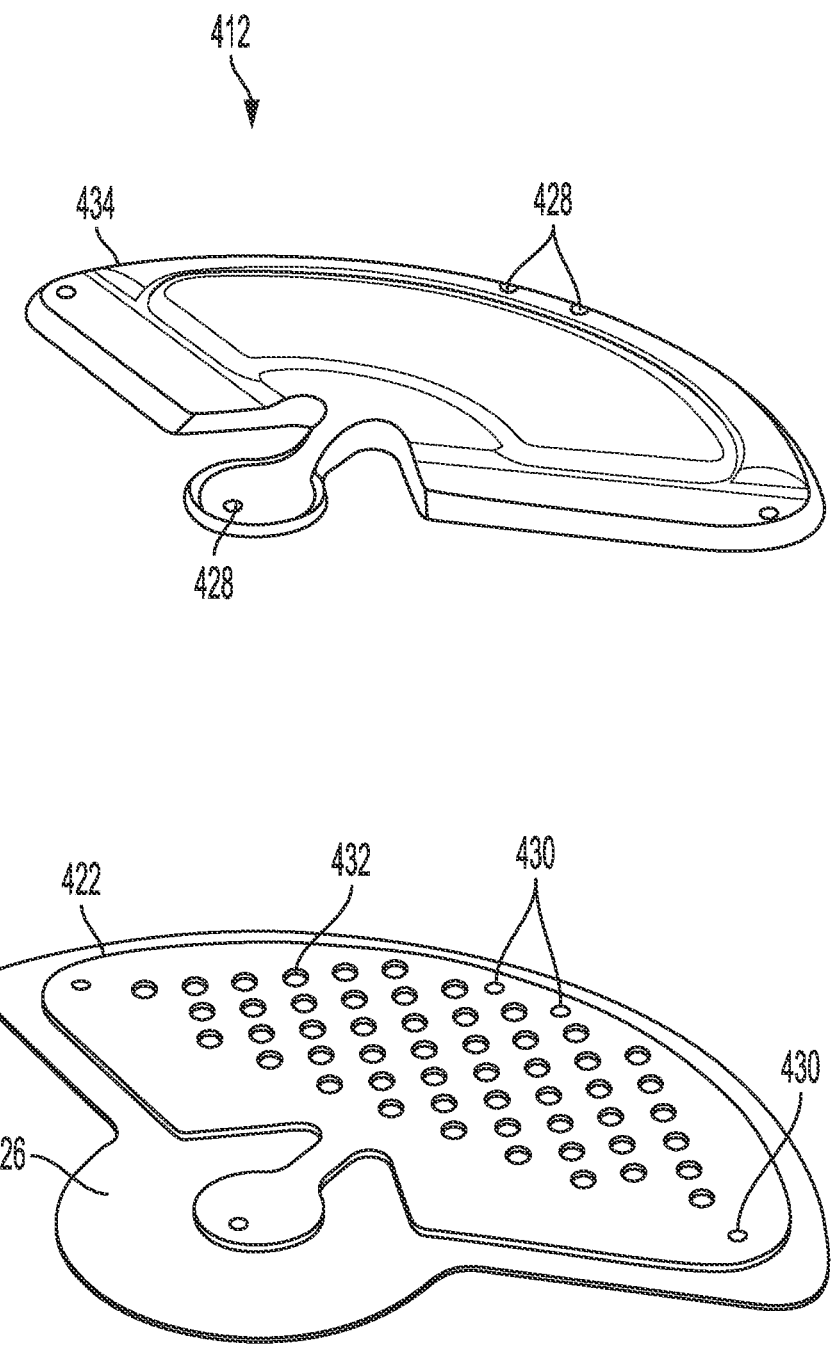
FIG. 4 is a three dimensional projection of a body of a training device prepared for coupling to an interface substrate, according to certain aspects of the present disclosure.

FIG. 4 is a three-dimensional projection of a body 434 of a training device 412 prepared for coupling to an interface substrate 422, according to certain aspects of the present disclosure. The training device 412 can by any suitable training device, such as training device 212 of FIG. 2. The training device 412 can have a fan-like shape. As used herein, the term training device can be exclusive of or inclusive of an interface substrate. For example, as used with reference to FIG. 4, the training device 412 is a component that is itself couplable to an interface substrate 422. However, in some cases, where appropriate, the term training device can include an interface substrate, such as after coupling an interface substrate 422 to a body 434.

In some cases, a training device 412 can be used with an interface substrate 422 to facilitate repeat applications. The use of an interface substrate 422 can minimize the need to clean the training device 412 or reapply conductive gels to electrodes of the training device 412. Instead, the electrodes of the training device 412 can fit within electrode-receiving spaces 432 of the interface substrate 422.

The interface substrate 422 can removably couple to the training device 412 in any suitable fashion, such as via magnetic attraction. As depicted in FIG. 4, the body 434 of the training device 412 includes a number of magnets 428 embedded therein, such as in the locator region, the blanket region, and the alignment edges. Each magnet 428 can correspond to a corresponding magnet 430 on the interface substrate 422. Thus, as the interface substrate 422 and training device 412 are brought together, the magnets 428 and corresponding magnets 430 will interact to pull the interface substrate 422 and training device 412 together. As depicted, multiple magnets 428 and corresponding magnets 430 are used, which can facilitate proper alignment of the training device 412 with respect to the interface substrate 422. In some cases, a single magnet 428 and corresponding magnet 430 can be used, such as to keep the interface substrate 422 and training device 412 and provide partial alignment assistance (e.g., translational alignment and not rotational alignment). In some cases, one or more magnets 428 or one or more corresponding magnets 430 can be substituted for a ferromagnetic component. For example, in some cases, one or more magnets 428 can be used to couple the training device 412 to the interface substrate 422 via magnetic attraction to a ferromagnetic, metal component of the interface substrate 422.

Interface substrate 422 is depicted with a top side facing the body 434 of the training device 412 and a bottom side covered by a peel-away layer 426. The peel-away layer 426 can provide protection for an adhesive layer of the interface substrate 422, as well as any other exposable layers (e.g., a conductive layer). The interface substrate 422 can be secured to the skin of the user by removing the peel-away layer 426 and applying force to press the interface substrate 422 onto the skin of the user. Before or after the interface substrate 422 is applied to the skin, the body 434 of the training device 412 can be coupled to the interface substrate 422 by bringing the training device 412 into sufficiently close proximity to and alignment to the interface substrate 422 such that the magnets 428 and corresponding magnets 430 can pull the interface substrate 422 and training device 412 together.

While the interface substrate 422 is depicted in FIG. 4 as being couplable to the training device 412 via magnets 428 and corresponding magnets 432, that need not always be the case. In some cases, the interface substrate 422 can removably couple to the training device 412 using other techniques, such as an adhesive layer, a snap feature, a suction feature (e.g., one or more suction cups, such as formed by the electrode-receiving spaces 432) or any other suitable technique. In some cases, an alignment tray can be used to facilitate proper alignment of the interface substrate 422 with the training device 412.

Figure 5:
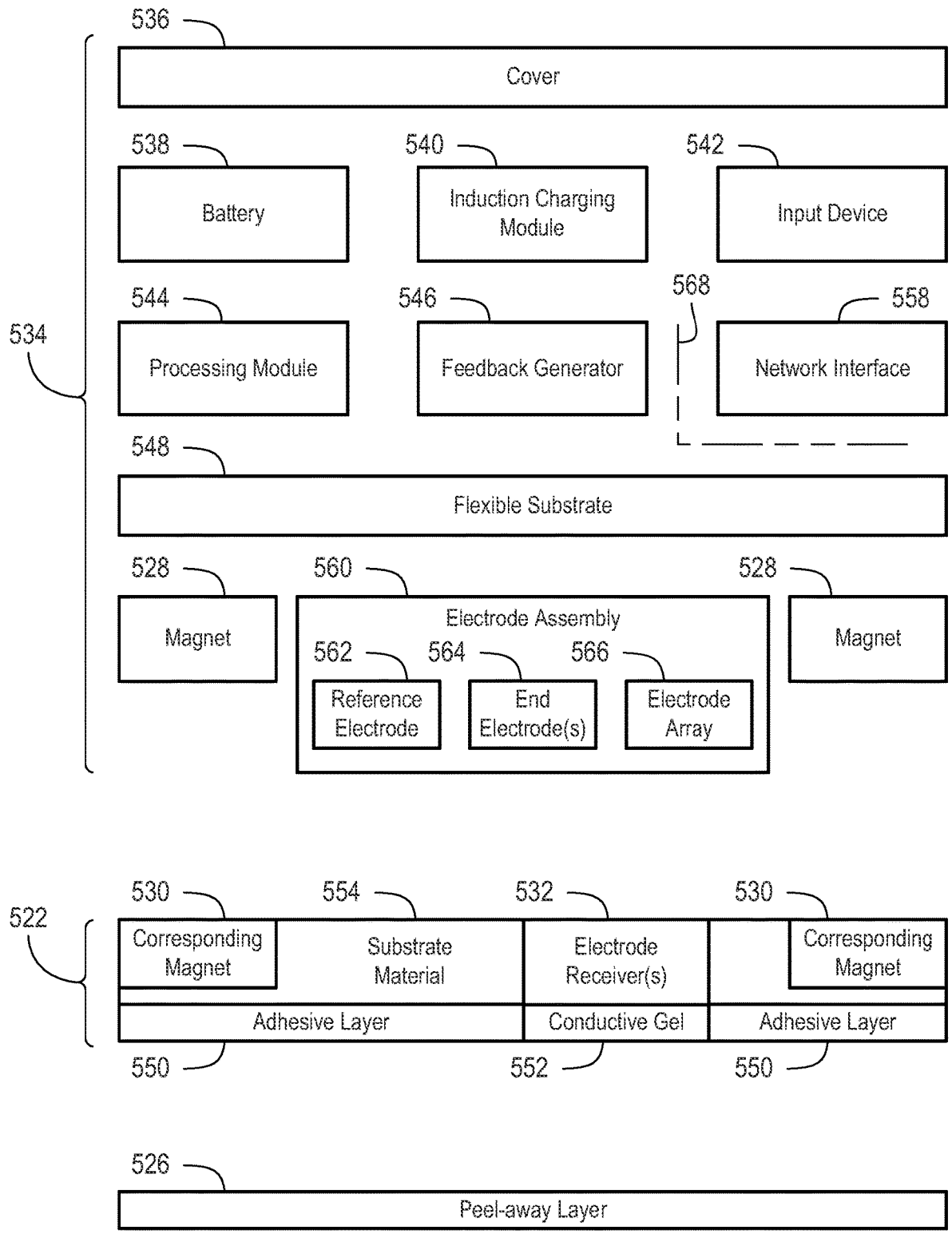
FIG. 5 is a schematic view of a training device, according to certain aspects of the present disclosure.

FIG. 5 is a schematic view of a training device 512, according to certain aspects of the present disclosure. The training device 512 can by any suitable training device, such as training device 212 of FIG. 2. Training device 512 can include a body 534 (e.g., an electronics module), an interface substrate 522, and a peel-away later 526.

The body 534 can include an outer cover 536 to provide protection and optional branding. The cover 536 can also include features to facilitate grasping and otherwise manipulating the body 534.

The body 534 can include a battery 538. The battery 538 can be any suitable power source capable of storing power to operate the training device 512, such as a traditional battery (e.g., alkaline battery or zinc battery), a rechargeable battery (e.g., a lithium-ion battery), or a high-capacity capacitor.

The body 534 can include an induction charging module 540. The induction charging module 540 can facilitate charging the battery 538. The induction charging module 540 can include an inductive loop and any additional components necessary to inductively charge the battery 538.

The body 534 can include an input device 542. The input device 542 can be any device suitable for receiving user input other than the electrodes of the electrode assembly 560. Examples of suitable input devices 524 include buttons (e.g., mechanical buttons or capacitive buttons), microphones (e.g., for voice input), switches, magnetic switches, and the like. In some cases, an input device 542 can include additional sensors for receiving information about the training device 512 or a surrounding environment. For example, such additional sensors can include temperature sensors, humidity sensors, inertial measurement units, and the like.

The body 534 can include a processing module 544. The processing module 544 can include a processor capable of executing instructions stored thereon or stored in an accessible memory of the processing module 544. In some cases, the processing module 544 can be or include an application specific integrated circuit (ASIC), a field programmable gate array (FPGA), a microprocessor, or the like. The processing module 544 can further include any electrical or electronic components necessary to perform the functions disclosed herein. The processing module 544 can receive electrical signals from the electrode assembly 560 and analyze them to determine whether or not a bruxism event is detected.

The body 534 can include a feedback generator 546. The feedback generator 546 can generate a feedback stimulus, such as in response to a detected bruxism event or an anticipated bruxism event. The feedback stimulus can be any suitable stimulus that is discernable by the user, such as an audio stimulus, a haptic stimulus, an electrical stimulus, a visual stimulus, an olfactory stimulus, or the like. For example, in some cases the feedback generator 546 can include a speaker to generate an audio stimulus, such as a beep, a tone, or a recording. In some cases, the feedback generator 546 can include a vibrating motor, a piezoelectrically driven weight, or other haptic generator to generate a haptic stimulus, such as a vibration, a tap, or other mechanically discernable stimulus. In some cases, the feedback generator 546 can include a voltage generator to generate an electrical current across the skin of the user (e.g., a transcutaneous electric nerve stimulator coupled to electrodes of the electrode assembly 560 or to separate electrodes not of the electrode assembly 560). In some cases, the feedback generator 546 can include an LED to generate light. In some cases, the feedback generator 546 can include a smell generator (e.g., an ozone generator or a pellet vaporizer) to generate smells.

The body 534 can include a network interface 558. The network interface 558 can permit the training device 512 (e.g., the processing module 544 of the training device 512) to communicatively couple to other devices, such as via wired or wireless connections. In some cases, the network interface 558 can include a radio transceiver capable of operating using an established radiofrequency communication standard, such as Bluetooth or WiFi standards.

The body 534 can include any number of each of modules 538, 540, 542, 544, 546, 558. In some cases, one or more of modules 538, 540, 542, 544, 546, 558 can be divided into multiple modules, or combined into one or more of the other modules 538, 540, 542, 544, 546, 558. For example, in some cases, a feedback generator 546 and input device 542 can be incorporated into a single module in the form of a piezoelectric, haptic button capable of receiving button presses and generating haptic feedback.

The body 534 can include a flexible substrate 548 that supports an electrode assembly 560 and optionally magnets 528. The flexible substrate 548 can be a flexible circuit board, and can optionally support one or more of the other modules 538, 540, 542, 544, 546, 558. The flexible substrate 548 can facilitate coupling the processing module 544 to the electrode assembly 560. The flexible substrate 548 can further facilitate the electrode assembly 560 conforming to the shape of the user's skin. In some cases, the flexible substrate 548, as a flexible circuit board, can include additional electronic or electrical components used to process the electrical signals received by the electrode assembly 560. For example, the flexible substrate 548 can include circuits to select electrode pairs, amplify signals, filter signals, and otherwise process electrical signals received by the electrode assembly 560.

In some cases, the body 534 can include an electromagnetic field (EMF) shielding layer 568, which can be positioned in any suitable location, such as between the flexible substrate 548 and the various modules 538, 540, 542, 544, 546, 558. Such an EMF shielding layer 568 can be made of an EMF shielding fabric. In particular, the EMF shielding layer 568 can be used to isolate the networking interface 558 from the electrode assembly 560 and optionally and other related components used to acquire the EMG measurements. In some cases, instead of or in addition to using an EMF shielding layer 568, the processing module 544 can filter out expected radio waves from the EMG measurements and/or control the EMG measurements and radio activation such that the radio is not transmitting while the EMG measurements are being taken.

The electrode assembly 560 can include a reference electrode 562, one or more end electrodes 564, and an electrode array 566. The electrode array 566 can include one or more mid electrodes, although often multiple mid electrodes are used. Each electrode of the electrode assembly 560 can be spaced apart from one another by a fixed, known distance along the flexible substrate 548. Thus, the location of each electrode of the electrode assembly 560 with respect to one another can be known in advance. Further, the electrodes of the electrode assembly 560 can be positioned with respect to one another such that placement of the reference electrode 562 on a user's gonial angle and placement of the end electrode(s) 564 along an inferior border of the user's mandible will result in placement of the electrode array 566 over the user's masseter muscle (e.g., over a bulk or middle of the user's masseter muscle). The electrodes of the electrode assembly 560 can be made of any suitable material, such as silver chloride.

The interface substrate 522 can include a substrate material 554 and an adhesive layer 550. Any suitable substrate material 554 can be used, such as silicone or foam. In some cases, optional corresponding magnets 530 can be incorporated into the substrate material 554 or otherwise positioned on the interface substrate 522 to engage the magnets 528 of the body 534 of the training device 512. The substrate material 554 can further include one or more electrode-receiving spaces 532 (e.g., one electrode-receiving space 532 for each electrode of the electrode assembly 560 or one electrode-receiving space 532 for multiple electrodes of the electrode assembly 560). Each electrode-receiving space 532 can be a hole, depression, aperture, or other opening in the substrate material 554 permitting the electrodes of the electrode assembly 560 to pass into and/or therethrough. In some cases, an optional conductive gel 552 is included at each electrode-receiving space 532 to facilitate electrical coupling between the electrodes and the user's skin. In some cases, instead of or in addition to a conductive gel 552, a different conductive material is used, such as a conductive silicone or a conductive foam.

A peel-away layer 526 can be removably coupled to the adhesive layer 550 and optional conductive gel 552 to provide protection before the interface substrate 522 is applied to the user's skin.

In use, the interface substrate 522 can be a single-use or multi-use disposable item. Thus, a single body 534 can be reused across multiple interface substrates 522.

Figure 6:
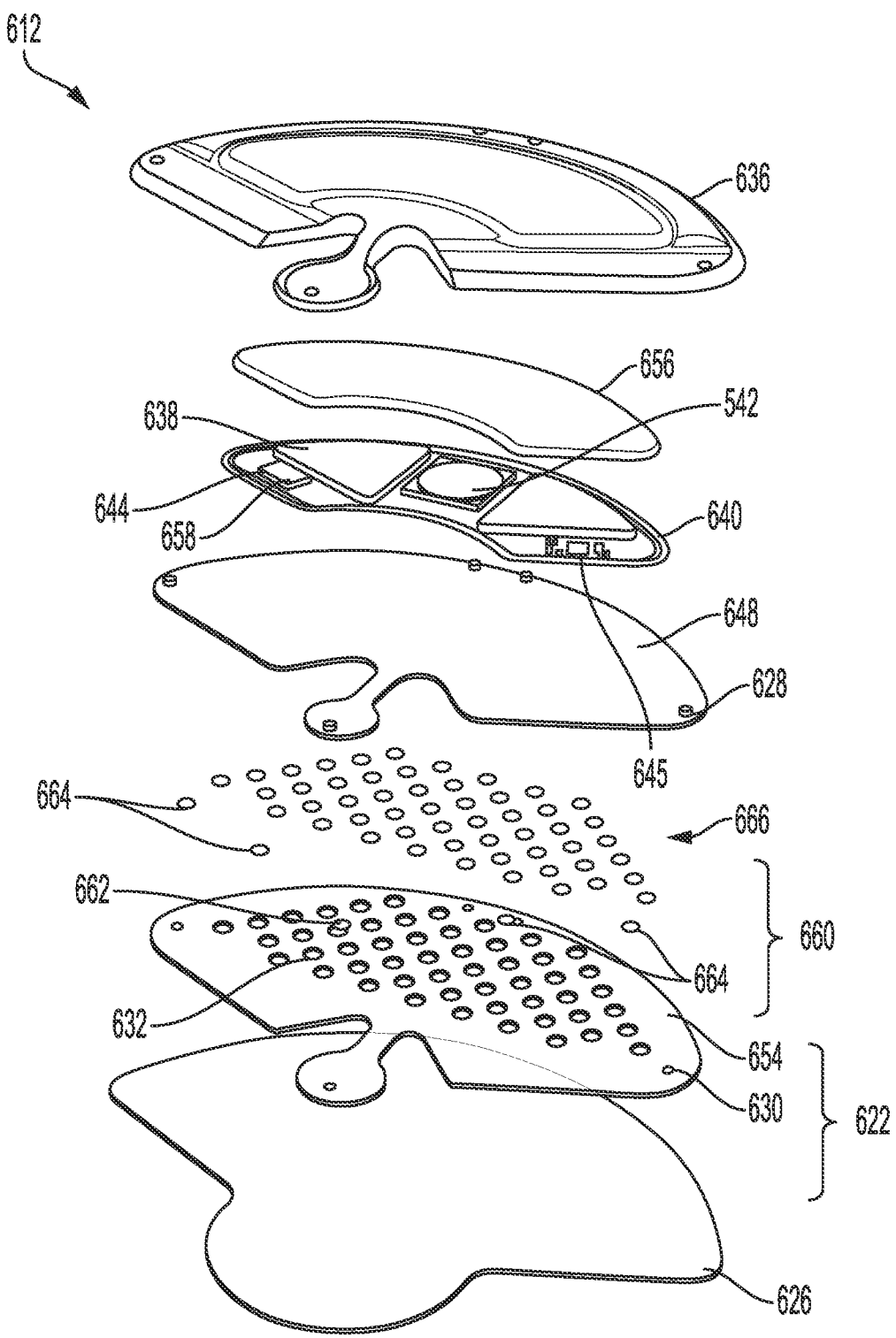
FIG. 6 is an exploded view of a training device, according to certain aspects of the present disclosure.

FIG. 6 is an exploded view of a training device 612, according to certain aspects of the present disclosure. The training device 612 can by any suitable training device, such as training device 212 of FIG. 2. The training device 612 can include a cover 636. In some cases, the cover 636 is a rigid cover, although that need not always be the case. In some cases, the cover 636 is transparent or translucent, in which case an optional undercover 656 can be used to provide aesthetic and/or informational features. For example, the undercover 656 can provide branding information for the training device 612.

The training device 612 can include an electronics package containing a battery 638, a battery charging management module 645, an induction coil 640, a network interface 658 (e.g., a wireless radio), a processing module 644, and a haptic button 542 (e.g., a combination input device and haptic feedback generator). As depicted in FIG. 6, the network interface 658 and processing module 644 are located in a single, combined module (e.g., a radio module with memory and one or more processors), although that need not always be the case.

The training device 612 can include a flexible substrate 648 with magnets 628 coupled thereto and an electrode assembly 660 coupled thereto. For illustrative purposes, the flexible substrate 648, which may be a flexible circuit board, is depicted as a solid material. Additionally, for illustrative purposes, the electrode assembly 660 is depicted exploded from the flexible substrate 648. Electrode assembly 660 can include an electrode array 666 of mid electrodes, a reference electrode 662, and multiple end electrodes 664.

The training device 612 can include an interface substrate 622 including a substrate material 654, corresponding magnets 630, and electrode-receiving spaces 632. A peel-away layer 626 can be removably coupled to the bottom side of the interface substrate 622, removal of which can expose an adhesive layer of the interface substrate 622, as well as an optional conductive layer.

Figure 7:
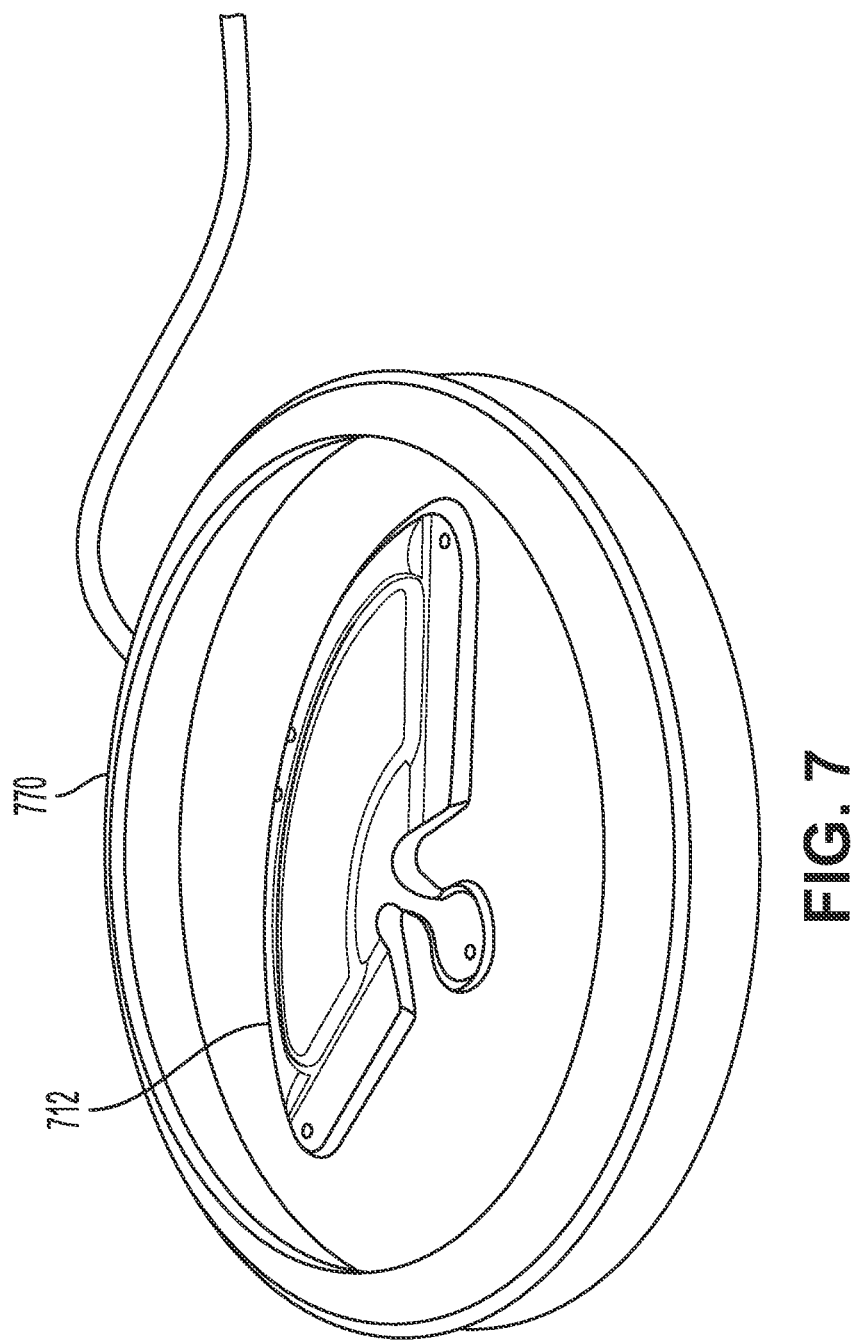
FIG. 7 is a three dimensional projection of a training device within a charging station, according to certain aspects of the present disclosure.

FIG. 7 is a three-dimensional projection of a training device 712 within a charging station 770, according to certain aspects of the present disclosure. The training device 712 can by any suitable training device, such as training device 212 of FIG. 2. The charging station 770 can include a receiving space for receiving the training device 712. When the training device 712 is placed within the receiving space, and optionally when a cover of the charging station 770 is closed, the charging station 770 can provide power to the training device 712 to charge a battery therein. In some cases, power is provided via induction charging, such as using the induction charging module of the training device 712 and an induction charging module of the charging station 770. In some cases, the charging station 770 can include a transparent or translucent window to provide visual access to the training device 712, such as to facilitate seeing whether or not the training device 712 is seated within the receiving space and/or whether or not the training device 712 is charging (e.g., as may be indicated by an LED or other light output on the training device 712).

In some cases, the charging station 770 can include an ultraviolet (UV) light source. The UV light source can output UV light suitable for preventing growth of contaminants (e.g., bacteria) on the training device 712 and/or otherwise sanitizing the training device 712. Any suitable UV light source can be used, such as a UV LED or an arc-generated UV light source.

In some cases, a charging station 770 can include an internal battery and a wired connection for charging the internal battery. The internal battery can be used to charge the training device 712 and otherwise power the charging station.

In some cases, the charging station 770 can act as a user device (e.g. user device 182 of FIG. 1), such as to receive logged data, generate feedback (e.g., vibrate or play a sound when bruxism is detected), or perform other functions. In such cases, the charging station 770 can be communicatively coupled to the training device 712, such as via a wireless connection.

In some cases, the charging station 770 can include a button or other user input device. Actuation of such a user input device can be used to put the charging station 770 into a pairing mode to facilitate pairing with the training device 712. The training device 712 can be put into a pairing mode, such as via actuation of a button or other input device on the training device 712.

Figure 8:
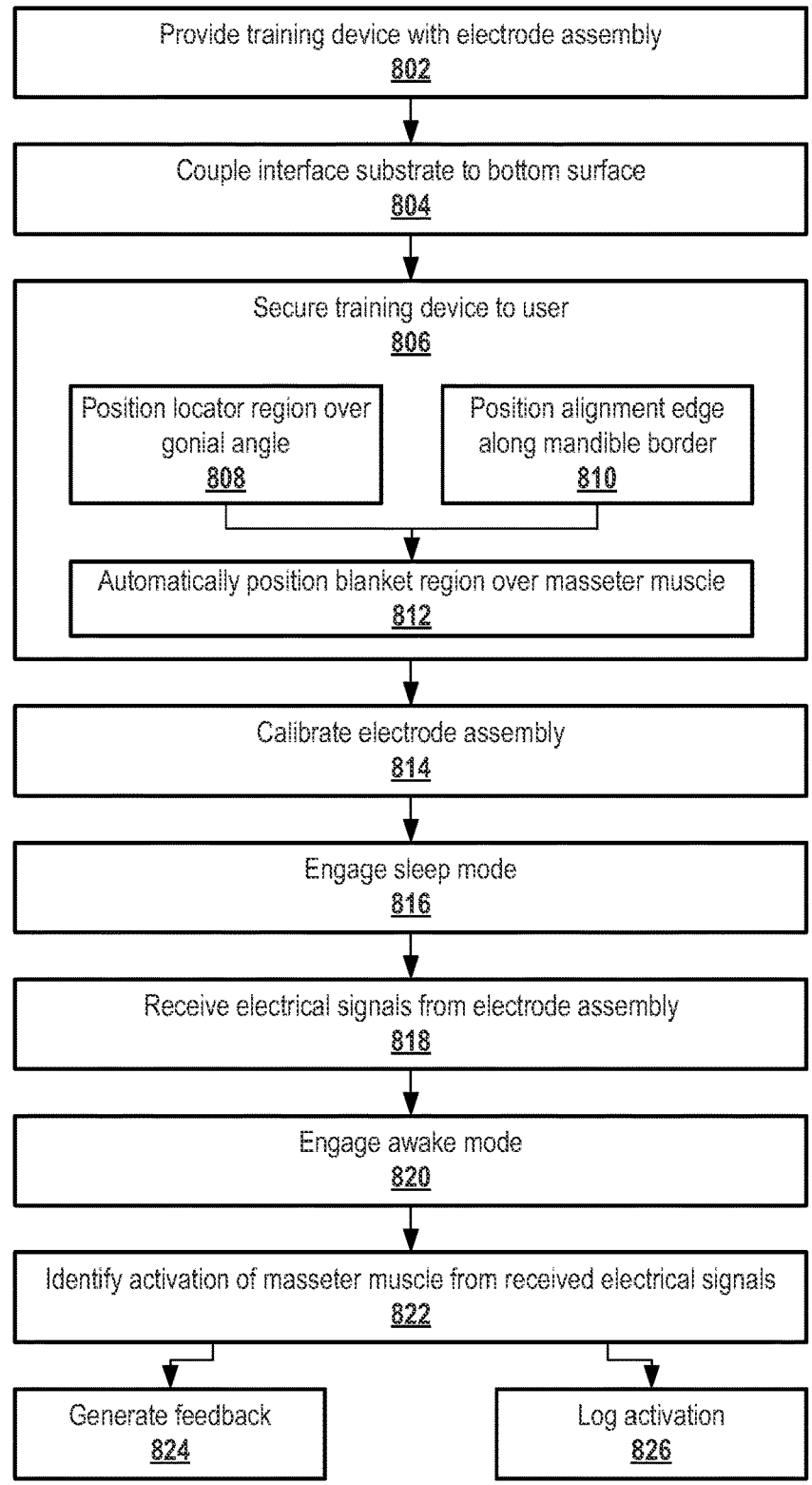
FIG. 8 is a flowchart depicting a process for using a training device, according to certain aspects of the present disclosure.

FIG. 8 is a flowchart depicting a process 800 for using a training device, according to certain aspects of the present disclosure. At block 802, a training device can be provided. The training device can be any suitable training device with an electrode assembly, such as training device 212 of FIG. 2.

At optional block 804, an interface substrate is coupled to a bottom surface of the training device. In some cases, instead of using an interface substrate, a layer of conductive gel and/or an adhesive layer can be applied to the bottom surface of the training device.

At block 806, the training device is secured to the user. Securing the training device to the user can include positioning the locator region of the training device over a gonial angle of the mandible of the user at block 808 and positioning the alignment edge of the training device along the mandible's inferior border at block 810. As a result of the positioning of the locator region and alignment edge at respective blocks 808, 810, the blanket region will be automatically positioned over the masseter muscle 812. In some cases, securing the training device to the user includes applying force to the training device to push an adhesive layer of the training device against the skin of the user. In some cases, securing the training device includes removably coupling the training device to the user in other fashions, such as via tape, straps, or clothing.

At block 814, the electrode assembly can be calibrated. Calibration of the electrode assembly can include measuring electrical signals across multiple pairs of electrodes. In some cases, each combination of electrode pairs available in the electrode assembly can be measured. In some cases, a subset of all possible electrode pairs is measured. In some cases, measuring electrical signals across multiple pairs of electrodes can include using one or more end electrodes as a mid electrode and/or using one or more mid electrodes as an end electrode. Calibrating the electrode assembly can include selecting one or more electrode pairs for use in detecting bruxism. The selected one or more electrode pairs can be selected based on their likelihood to provide accurate bruxism detection, such those electrode pairs having the greatest signal (e.g., highest signal) during clenching of the jaw or grinding of the teeth. In some cases, calibration of the electrode assembly 814 can occur after securing the training device to the user 806 and before identifying a first bruxism event. In some cases, calibration of the electrode assembly 814 can include presenting instructions to the user (e.g., via a user device, such as a smartphone) to engage in an action associated with a bruxism event, such as jaw clenching or teeth grinding, and/or to engage in a jaw movement not associated with a bruxism event, such as talking, breathing, or chewing. In such cases, measurements can be acquired while the user is engaging in such actions. These measurements can be used to identify those electrode pairs that are strongly correlated with bruxism events and that are not strongly correlated with jaw movements not associated with bruxism events. Once the electrode assembly has been calibrated at block 814, future electrical signals received from the electrode assembly can be received from the electrode pairs identified during the calibration process.

In some optional cases, the training device can engage a sleep mode at block 816. In the sleep mode, the training device can use a minimal or reduced amount of power, thus maximizing or extending the battery life. In some cases, the training device can be moved between a sleep mode and an awake mode manually (e.g., via actuation of a button), periodically (e.g., at a certain time of day or after a certain delay), and/or automatically (e.g., in response to receiving a sufficiently large electrical signal from the electrode assembly).

At block 818, electrical signals are received from the electrode assembly. Receiving electrical signals can include receiving electrical signals from the electrode pairs identified during calibration at block 814. Receiving electrical signals can include receiving electrical signals associated with activation of one or more motor units of a muscle (e.g., the masseter muscle).

In some optional cases, at block 820, an awake mode can be automatically engaged in response to receiving electrical signals at block 818. In some cases, the awake mode is automatically engaged if the received electrical signals exceed a threshold value. In some cases, the threshold value for engaging the awake mode can be less than a threshold value for identifying a bruxism event, although that need not always be the case. In the awake mode, the training device can use more power than in the sleep mode. In the awake mode, additional components of the training device can be powered on, such as the processing module, the network module, and/or other modules.

At block 822, activation of the masseter muscle can be identified based on the received electrical signals. In some cases, identifying activation of the masseter muscle can include identifying a bruxism event. In some cases, in response to identifying activation of the masseter muscle at block 822, feedback can be generated at block 824. Generation of feedback at block 824 can include generating audio feedback, haptic feedback, electrical feedback, visual feedback, or the like. In use, the generated feedback is designed to notify the user of the bruxism event to help train the user to self-recognize bruxism events and/or avoid future bruxism events.

In some cases, at block 826, the identified activation of the master muscle from block 822 is logged. In some cases, instead of or in addition to simply logging muscle activation, block 822 can include logging EMG data, such as the received electrical signals form block 818.

Process 800 is disclosed with various blocks in a given order, however process 800 can be performed with fewer blocks, additional blocks, and in different orders. For example, in some cases, process 800 can include engaging an awake mode at block 820 manually prior to receiving electrical signals at block 818. In another example, process 800 can include receiving electrical signals at block 818 without first calibrating the electrode assembly at block 814. In yet another example, process 800 can further include predicting a future or anticipated bruxism event based on the received electrical signals from block 818, which future or anticipated bruxism event can be used to generate feedback at block 824.

Various aspects of the present disclosure can be implemented using electronic devices, such as computers, processors, controllers, smartphones, and the like. Instructions to implement various aspects and features of the present disclosure can be stored in machine-readable memory, such as non-transitory memory. Such memory can be further used to store logged information, such as EMG data, muscle activation data, received electrical signal data, and the like. In some cases, certain aspects of the present disclosure can be implemented using ASICs, PFGA, data processors (e.g., general or special-purpose processors), or the like. As used herein, a processor can include one or more cores and/or one or more sub-processors.

The features can be implemented in a computing system that includes a back-end component, such as a data server, or that includes a middleware component, such as an application server or an Internet server, or that includes a front-end component, such as a client computer or user device having a graphical user interface or an Internet browser, or any combination thereof. The components of the system can be connected by any form or medium of digital data communication such as a communication network. Examples of communication networks include, e.g., a local area network (LAN), a wide area network (WAN), and the computers and networks forming the Internet. Additionally, one or more features or steps of the disclosed embodiments can be implemented using an application programming interface (API), such as an API to send and/or receive EMG data to and/or from a server.

Figure 9:
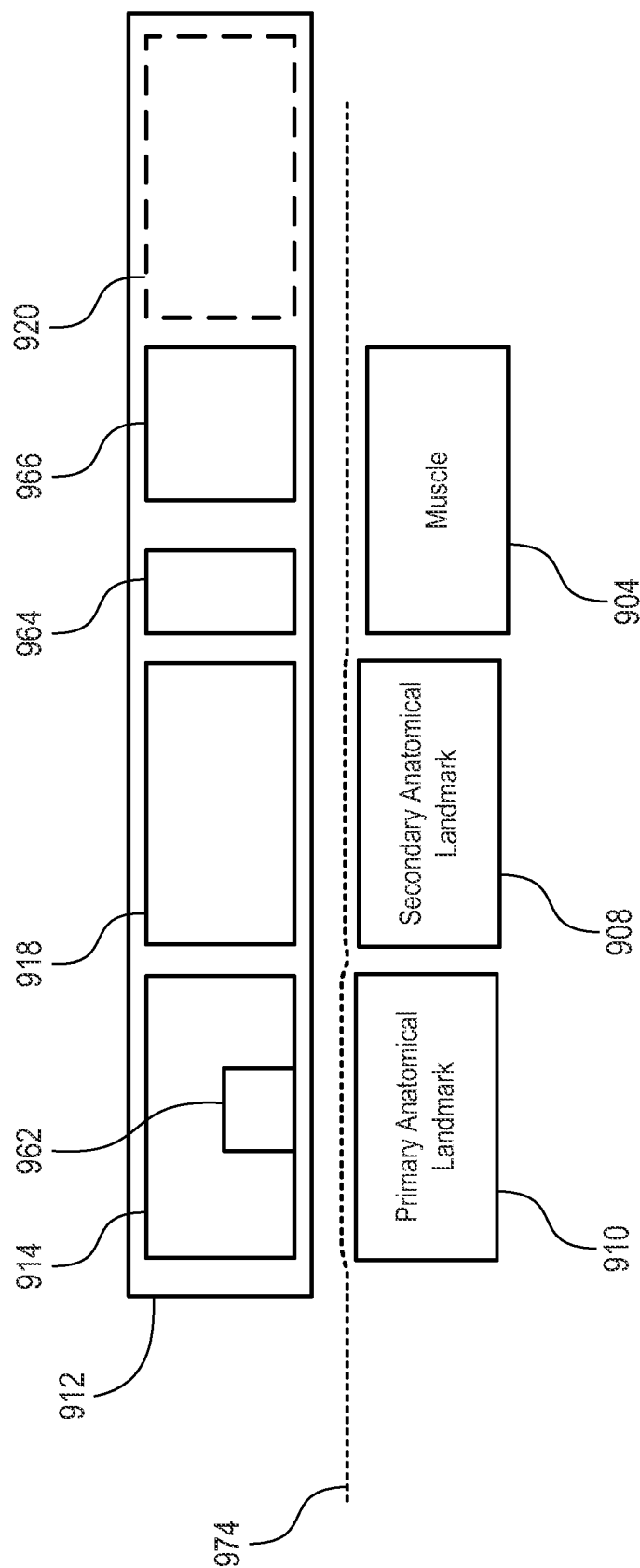
FIG. 9 is a schematic diagram depicting a training device as used to measure a target muscle, according to certain aspects of the present disclosure.

FIG. 9 is a schematic diagram depicting a training device 912 as used to measure a target muscle 904, according to certain aspects of the present disclosure. The training device 912 can be any suitable training device, such as training device 112. Training device 912 includes a locator region 914, a first alignment region 918, and optionally a second alignment region 920. The training device 912 further includes one or more end electrodes 964 and one or more electrode arrays 966. In some cases, the one or more end electrodes 964 can be positioned at the first alignment region 918 or second alignment region 920, although that need not always be the case. In some cases, the one or more electrode arrays 966 can be positioned at a blanket region, although that need not always be the case. The locator region 914 can include a reference electrode 962.

The locator region 914, first alignment region 918, one or more end electrodes 964, one or more electrode arrays 966, and, when included, second alignment region 920 are in a known, fixed position with respect to one another and a surface of the training device 912.

The locator region 914 can be configured to be placed over a primary anatomical landmark 910 of a user. The primary anatomical landmark 910 can be any suitable visually and/or palpably discernable landmark under the skin 974 of the user. In some cases, the primary anatomical landmark 910 is a bony feature, such as a gonial angle or a tip of a mastoid process.

With the locator region 914 paced over the primary anatomical landmark 910, the first alignment region 918 can be placed over the secondary anatomical landmark 908. The secondary anatomical landmark 908 can be any suitable visually and/or palpably discernable landmark under the skin 974 of the user. In some cases, the secondary anatomical landmark 910 is a bony feature or a cartilage-based feature, although that need not always be the case. Examples of secondary anatomical landmarks 910 include a border of the mandible, a border of the mastoid process, an edge of the ear, or the like.

In some cases, the second alignment region 920 can be configured to be placeable over a contralateral secondary anatomical landmark (e.g., a secondary anatomical landmark that is contralateral to the secondary anatomical landmark 908) when the locator region 914 is placed over a contralateral primary anatomical landmark (e.g., a primary anatomical landmark that is contralateral to the primary anatomical landmark 910). For example, the first alignment region 918 and second alignment region 920 can be positioned in a mirrored fashion across a line interesting or bisecting the locator region 914.

When the locator region 914 is positioned over the primary anatomical landmark 910 and the first alignment region 918 is positioned over the secondary anatomical landmark 908, the one or more end electrodes 964 can be automatically positioned over or adjacent an end of a target muscle 904 and the one or more electrode arrays 966 can be automatically positioned over the target muscle 904 and spaced apart from the one or more end electrodes 964. For example, the one or more electrode arrays 966 can be positioned over a bulk of the target muscle 904. In an example, when the primary anatomical landmark 910 is a gonial angle and the secondary anatomical landmark 908 is a border of the mandible, the target muscle 904 can be the masseter muscle. In another example, when the primary anatomical landmark 910 is a tip of a mastoid process and the secondary anatomical landmark 908 is a border of the mastoid process, the target muscle 904 can be the temporalis muscle. Target muscle 904 can be any muscle associated with bruxism (e.g., any muscle whose contraction is correlative or otherwise indicative of bruxism events).

The primary anatomical landmark 910, secondary anatomical landmark 908, and target muscle 904 can have a known relative position with respect to one another. Thus, the training device 912 can be shaped such that when the locator region 914 is positioned over the primary anatomical landmark 910 and the first alignment region 918 is positioned over the secondary anatomical landmark 908, the one or more end electrodes 964 will be positioned over or adjacent an end of a target muscle 904 and the one or more electrode arrays 966 will be positioned over the target muscle 904 and spaced apart from the one or more end electrodes 964 (e.g., positioned over a bulk of the target muscle 904). Thus, the primary anatomical landmark 910 and secondary anatomical landmark 908 can be used to ensure easy, consistent, and repeatable locating of the one or more end electrodes 964 and one or more electrode arrays 966 for measurement of the target muscle 904.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art. Numerous changes to the disclosed embodiments can be made in accordance with the disclosure herein, without departing from the spirit or scope of the disclosure. Thus, the breadth and scope of the present disclosure should not be limited by any of the above described embodiments.

Although certain aspects and features of the present disclosure have been illustrated and described with respect to one or more implementations, equivalent alterations and modifications will occur or be known to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only, and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

As used below, any reference to a series of examples is to be understood as a reference to each of those examples disjunctively (e.g., "Examples 1-4" is to be understood as "Examples 1, 2, 3, or 4").

Example 1 is a training device, comprising: a body having a locator region, a blanket region, and an alignment edge, wherein the locator region, the blanket region, and the alignment edge are fixedly spaced apart such that the blanket region is positioned over a masseter muscle of a user when the locator region is positioned over a gonial angle of a mandible of the user and the alignment edge is positioned along an inferior border of the mandible of the user; an electrode assembly including: a reference electrode positioned at the locator region; at least one end electrode positioned at the alignment edge; and an electrode array including a plurality of mid electrodes, the electrode array positioned at the blanket region; and a processing module coupled to the electrode assembly for identifying activation of the masseter muscle using the electrode assembly.

Example 2 is the training device of example(s) 1, wherein the body further comprises an additional alignment edge, wherein the electrode assembly further includes at least one additional end electrode positioned at the additional alignment edge, wherein the additional alignment edge is fixedly spaced apart with respect to the locator region and the blanket region such that the blanket region is positioned over a contralateral masseter muscle of the user when the locator region is positioned over a contralateral gonial angle of the mandible of the user and the additional alignment edge is positioned along a contralateral border of the mandible of the user.

Example 3 is the training device of example(s) 2, wherein the alignment edge and the additional alignment edge are symmetrically located about a line intersecting a center of the blanket region and a center of the locator region.

Example 4 is the training device of example(s) 1-3, wherein the locator region includes a mechanical indication to facilitate aligning the locator region with the gonial angle.

Example 5 is the training device of example(s) 4, wherein the mechanical indication includes a bounded surface area coupled to the alignment edge via the blanket region and coupled to the blanket region via an isthmus.

Example 6 is the training device of example(s) 1-5, further comprising a feedback generator coupled to the processing module for generating biofeedback in response to identified activation of the masseter muscle.

Example 7 is the training device of example(s) 1-6, wherein the feedback generator includes i) a haptic feedback device; ii) an audio feedback device; iii) an electrical feedback device; iv) a visual feedback device; v) or any combination of i-iv.

Example 8 is the training device of example(s) 1-7, further comprising a memory coupled to the processing module to record identified activation of the masseter muscle.

Example 9 is the training device of example(s) 1-8, further comprising an interface substrate couplable to a bottom surface of the body to removably secure the body to the user, wherein the interface substrate includes a plurality of electrode-receiving spaces for accepting each electrode of the electrode assembly.

Example 10 is the training device of example(s) 9, wherein each of the plurality of electrode-receiving spaces includes a depression of the interface substrate and a conductive material exposed to a user-facing surface of the interface substrate.

Example 11 is the training device of example(s) 9 or 10, further including one or more magnets positioned in the body, wherein the interface substrate further includes one or more corresponding magnets that correspond to the one or more magnets to engage the one or more magnets and couple the interface substrate to the body.

Example 12 is the training device of example(s) 11, wherein the one or more magnets include at least a plurality of magnets, wherein the one or more corresponding magnets include at least a plurality of corresponding magnets, and wherein the plurality of corresponding magnets engage the plurality of magnets to align the electrodes of the electrode assembly with the plurality of electrode-receiving spaces of the interface substrate.

Example 13 is the training device of example(s) 1-12, further comprising: a battery coupled to the processing module; and an induction charging module for supplying power to the battery.

Example 14 is the training device of example(s) 1-13, further comprising an electromagnetic shielding layer positioned between the processing module and the electrode assembly, wherein the electromagnetic shielding layer is made of an electromagnetic shielding fabric.

Example 15 is a method, comprising: providing a training device having a locator region, an alignment edge, and a blanket region, the training device further including an electrode assembly including: a reference electrode positioned at the locator region; at least one end electrode positioned at the alignment edge; and an electrode array including a plurality of mid electrodes, the electrode array positioned at the blanket region; securing the training device to a user, wherein securing the training device to the user includes: positioning the locator region over a gonial angle of a mandible of the user; positioning the alignment edge along an inferior border of the mandible of the user; and automatically positioning the blanket region over a masseter muscle of the user in response to positioning the locator region over the gonial angle and positioning the alignment edge along the inferior border of the mandible; receiving electrical signals from the electrode assembly; identifying activation of the masseter muscle based on the received electrical signals.

Example 16 is the method of example(s) 15, further comprising: generating feedback in response to identifying the activation of the masseter muscle, wherein generating the feedback include i) generating haptic feedback; ii) generating audio feedback; iii) generating electrical feedback; iv) generating visual feedback; v) or any combination of i-iv.

Example 17 is the method of example(s) 15 or 16, wherein the training device further includes an additional alignment edge, wherein the electrode assembly further includes at least one additional end electrode positioned at the additional alignment edge, the method further comprising: removing the training device from the user; and reattaching the training device to the user contralaterally, wherein securing the training device to the user contralaterally includes: positioning the locator region over a contralateral gonial angle of the mandible of the user; positioning the additional alignment edge along a contralateral border of the mandible of the user; and automatically positioning the blanket region over a contralateral masseter muscle of the user in response to positioning the locator region over the contralateral gonial angle and positioning the additional alignment edge along the contralateral border of the mandible.

Example 18 is the method of example(s) 15-17, further comprising: removably coupling an interface substrate to a bottom surface of the training device, the interface substrate having a plurality of electrode-receiving spaces associated with respective electrodes of the electrode assembly, wherein removably coupling the interface substrate to the bottom surface includes securing the interface substrate to the bottom surface via magnetic attraction, and wherein securing the training device to the user includes adhering the interface substrate to skin of the user.

Example 19 is the method of example(s) 15-18, further comprising: engaging a sleep mode of the training device; and engaging an awake mode of the training device in response to receiving the electrical signals from the electrode assembly when the electrical signals exceed a threshold amount, wherein the training device uses less power in the sleep mode than in the awake mode.

Example 20 is the method of example(s) 15-19, further comprising calibrating the electrode assembly after securing the training device to the user, wherein calibrating the electrode assembly includes: receiving calibration electrical signals for a plurality of electrode pairs, wherein each electrode pair of the plurality of electrode pairs is a unique combination of electrodes of the electrode assembly; and identifying a subset of electrode pairs from the plurality of electrode pairs based on the received calibration electrical signals, wherein identifying activation of the masseter muscle based on the received electrical signals includes identifying activation of the masseter muscle based on received electrical activity for each of the subset of electrode pairs.

What is claimed is:

1. A training device, comprising:
a body having a locator region, a blanket region, and an alignment edge, wherein the locator region, the blanket region, and the alignment edge are fixedly spaced apart such that the blanket region is positioned over a masseter muscle of a user when the locator region is positioned over a gonial angle of a mandible of the user and the alignment edge is positioned along an inferior border of the mandible of the user;
an electrode assembly including:
a reference electrode positioned at the locator region;
at least one end electrode positioned at the alignment edge; and
an electrode array including a plurality of mid electrodes, the electrode array positioned at the blanket region; and
a processing module coupled to the electrode assembly for identifying activation of the masseter muscle using the electrode assembly.

2. The training device of claim 1, wherein the body further comprises an additional alignment edge, wherein the electrode assembly further includes at least one additional end electrode positioned at the additional alignment edge, wherein the additional alignment edge is fixedly spaced apart with respect to the locator region and the blanket region such that the blanket region is positioned over a contralateral masseter muscle of the user when the locator region is positioned over a contralateral gonial angle of the mandible of the user and the additional alignment edge is positioned along a contralateral border of the mandible of the user.

3. The training device of claim 2, wherein the alignment edge and the additional alignment edge are symmetrically located about a line intersecting a center of the blanket region and a center of the locator region.

4. The training device of claim 1, wherein the locator region includes a mechanical indication to facilitate aligning the locator region with the gonial angle.

5. The training device of claim 4, wherein the mechanical indication includes a bounded surface area coupled to the alignment edge via the blanket region and coupled to the blanket region via an isthmus.

6. The training device of claim 1, further comprising a feedback generator coupled to the processing module for generating biofeedback in response to identified activation of the masseter muscle.

7. The training device of claim 1, wherein the feedback generator includes i) a haptic feedback device; ii) an audio feedback device; iii) an electrical feedback device; iv) a visual feedback device; v) or any combination of i-iv.

8. The training device of claim 1, further comprising a memory coupled to the processing module to record identified activation of the masseter muscle.

9. The training device of claim 1, further comprising an interface substrate couplable to a bottom surface of the body to removably secure the body to the user, wherein the interface substrate includes a plurality of electrode-receiving spaces for accepting each electrode of the electrode assembly.

10. The training device of claim 9, wherein each of the plurality of electrode-receiving spaces includes a depression of the interface substrate and a conductive material exposed to a user-facing surface of the interface substrate.

11. The training device of claim 9, further including one or more magnets positioned in the body, wherein the interface substrate further includes one or more corresponding magnets that correspond to the one or more magnets to engage the one or more magnets and couple the interface substrate to the body.

12. The training device of claim 11, wherein the one or more magnets include at least a plurality of magnets, wherein the one or more corresponding magnets include at least a plurality of corresponding magnets, and wherein the plurality of corresponding magnets engage the plurality of magnets to align the electrodes of the electrode assembly with the plurality of electrode-receiving spaces of the interface substrate.

13. The training device of claim 1, further comprising:
a battery coupled to the processing module; and
an induction charging module for supplying power to the battery.

14. The training device of claim 1, further comprising an electromagnetic shielding layer positioned between the processing module and the electrode assembly, wherein the electromagnetic shielding layer is made of an electromagnetic shielding fabric.

15. A method, comprising:
providing a training device having a locator region, an alignment edge, and a blanket region, the training device further including an electrode assembly including:
a reference electrode positioned at the locator region;
at least one end electrode positioned at the alignment edge; and
an electrode array including a plurality of mid electrodes, the electrode array positioned at the blanket region;
securing the training device to a user, wherein securing the training device to the user includes:
positioning the locator region over a gonial angle of a mandible of the user;
positioning the alignment edge along an inferior border of the mandible of the user; and
automatically positioning the blanket region over a masseter muscle of the user in response to positioning the locator region over the gonial angle and positioning the alignment edge along the inferior border of the mandible;
receiving electrical signals from the electrode assembly;
identifying activation of the masseter muscle based on the received electrical signals.

16. The method of claim 15, further comprising:
generating feedback in response to identifying the activation of the masseter muscle, wherein generating the feedback include i) generating haptic feedback; ii) generating audio feedback; iii) generating electrical feedback; iv) generating visual feedback; v) or any combination of i-iv.

17. The method of claim 15, wherein the training device further includes an additional alignment edge, wherein the electrode assembly further includes at least one additional end electrode positioned at the additional alignment edge, the method further comprising:
removing the training device from the user; and
reattaching the training device to the user contralaterally, wherein securing the training device to the user contralaterally includes:
positioning the locator region over a contralateral gonial angle of the mandible of the user;
positioning the additional alignment edge along a contralateral border of the mandible of the user; and
automatically positioning the blanket region over a contralateral masseter muscle of the user in response to positioning the locator region over the contralateral gonial angle and positioning the additional alignment edge along the contralateral border of the mandible.

18. The method of claim 15, further comprising:
removably coupling an interface substrate to a bottom surface of the training device, the interface substrate having a plurality of electrode-receiving spaces associated with respective electrodes of the electrode assembly, wherein removably coupling the interface substrate to the bottom surface includes securing the interface substrate to the bottom surface via magnetic attraction, and wherein securing the training device to the user includes adhering the interface substrate to skin of the user.

19. The method of claim 15, further comprising:
engaging a sleep mode of the training device; and
engaging an awake mode of the training device in response to receiving the electrical signals from the electrode assembly when the electrical signals exceed a threshold amount, wherein the training device uses less power in the sleep mode than in the awake mode.

20. The method of claim 15, further comprising calibrating the electrode assembly after securing the training device to the user, wherein calibrating the electrode assembly includes:
receiving calibration electrical signals for a plurality of electrode pairs, wherein each electrode pair of the plurality of electrode pairs is a unique combination of electrodes of the electrode assembly; and
identifying a subset of electrode pairs from the plurality of electrode pairs based on the received calibration electrical signals, wherein identifying activation of the masseter muscle based on the received electrical signals includes identifying activation of the masseter muscle based on received electrical activity for each of the subset of electrode pairs.

* * * * *